J. K. SHARPE, Jr.
GRAIN SAVING DEVICE FOR THRESHING MACHINES.
APPLICATION FILED AUG. 4, 1913.
1,175,019.
Patented Mar. 14, 1916.
2 SHEETS—SHEET 1.
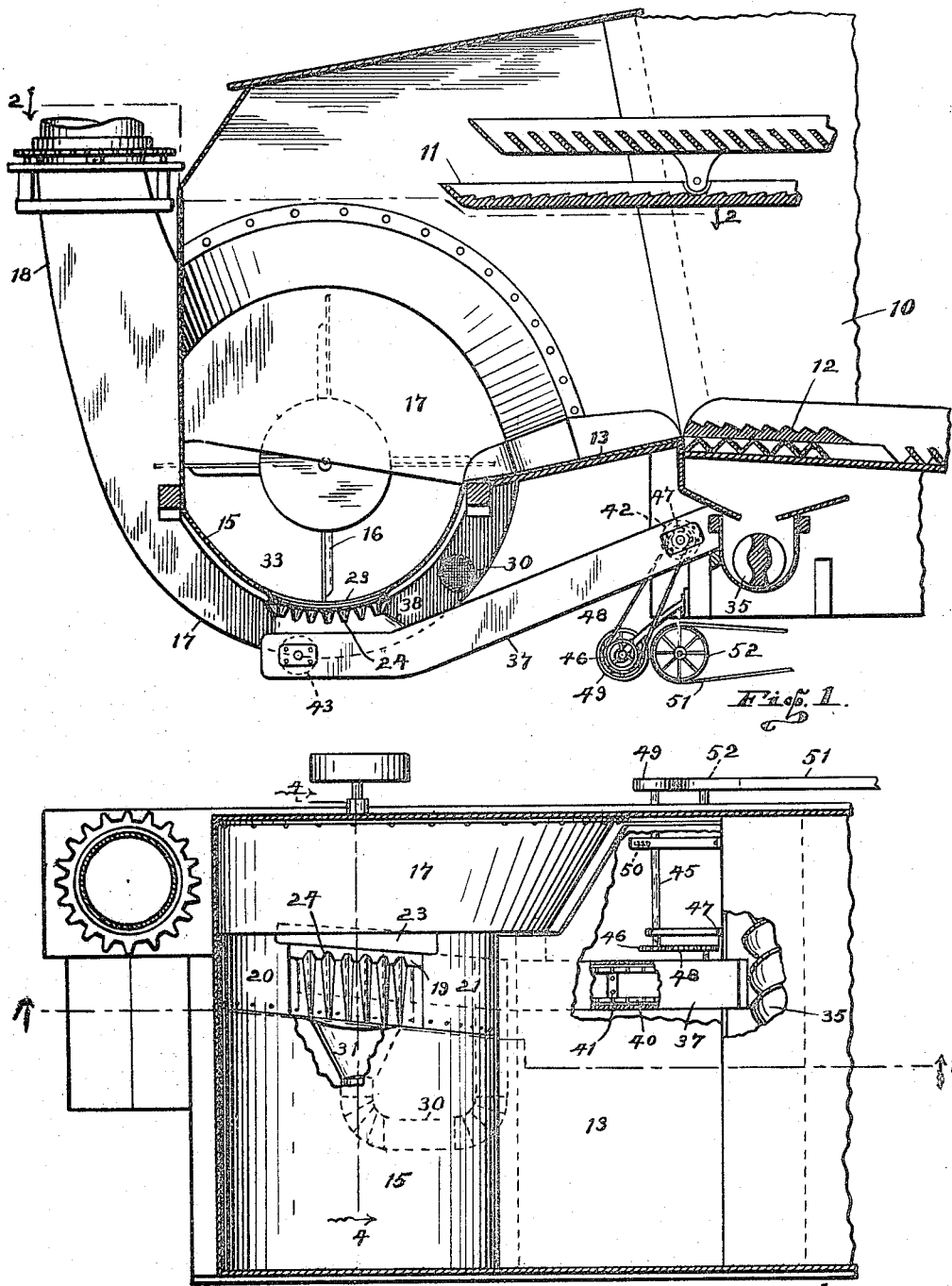

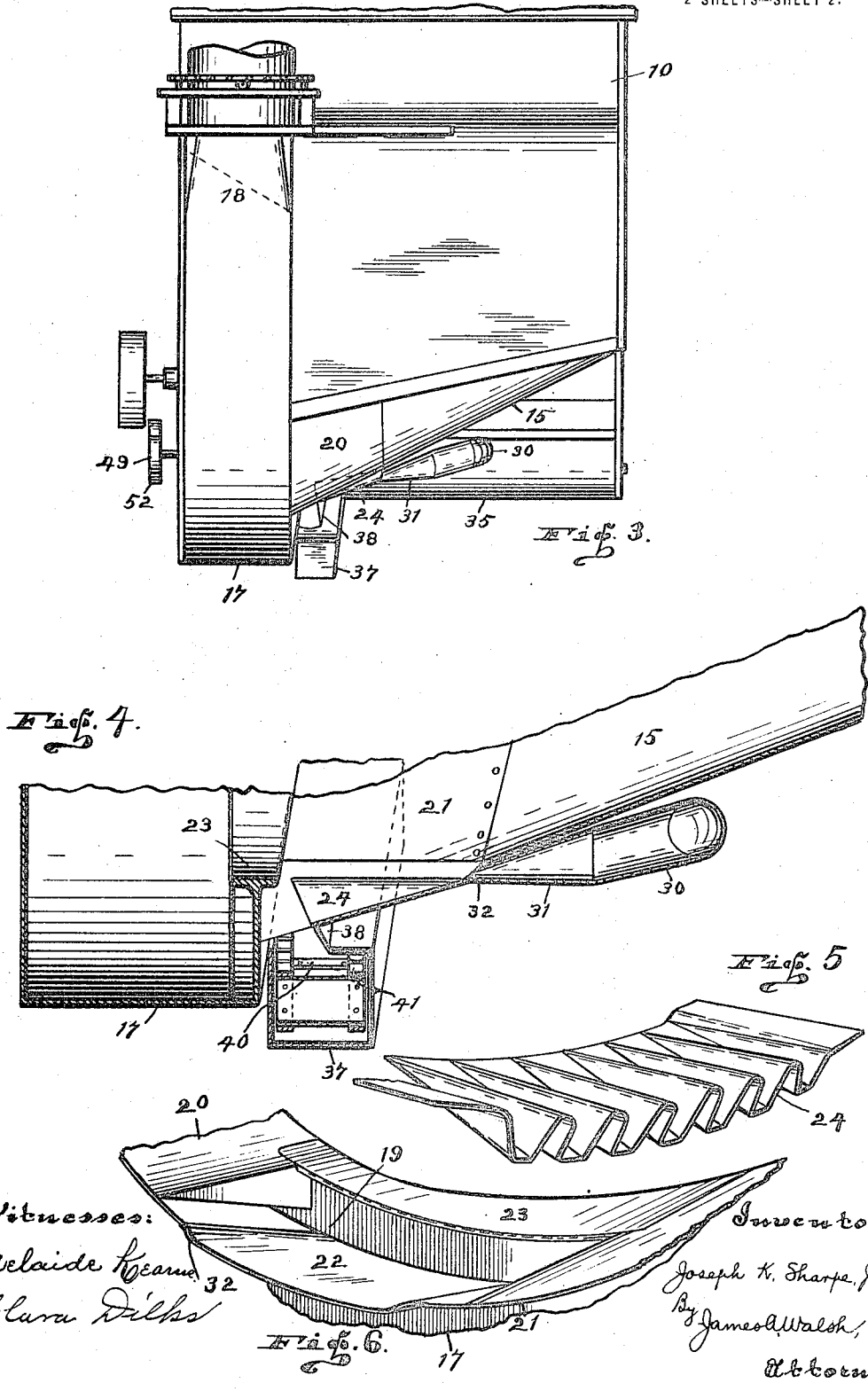

1,175,019. Specification of Letters Patent. Patented Mar. 14, 1916.

Application filed August 4, 1913. Serial No. 782,882.

*To all whom it may concern:*

Be it known that I, JOSEPH K. SHARPE, Jr., a citizen of the United States, residing at Indianapolis, in the county of Marion and State of Indiana, have invented certain new and useful Improvements in Grain-Saving Devices for Threshing-Machines, of which the following is a specification.

In threshing grain the greater portion thereof is separated from the straw by the cylinder of the threshing machine, to which it is first introduced, after which the straw, together with chaff, etc., is caused to travel rapidly through the machine to be further operated upon by a multiplicity of separating devices such as vibrating racks, conveyers, sieves, winnowers, and the like, and discharged at the rear end of the machine, from which it is conveyed, usually by a wind stacker, to a straw stack or elsewhere. However, it is well known in practice that a considerable portion of the grain does not become separated from the straw, chaff and tailings during the threshing operation, but is carried from the machine with the discharging straw and chaff to the straw stack and becomes wasted, so that a material loss of grain occurs to a more or less extent each time a threshing or similar machine is operated in the field or elsewhere.

The object of my invention is to provide means, in connection with the windstacker, by which such grain may be separated from the material discharging thereinto from the threshing machine, and saved by diverting it from the stacker hopper into a suitable receptacle or otherwise.

In the accompanying drawings, which are made a part hereof, Figure 1 is a longitudinal sectional view taken on the dotted line 1—1 in Fig. 2 through the rear end of a threshing machine and a wind stacker and showing my invention in connection therewith; Fig. 2, a horizontal sectional view taken on the dotted line 2—2 in Fig. 1; Fig. 3, a rear elevation of the stacker; Fig. 4, a transverse sectional view through the stacker as seen when looking in the direction indicated by the arrows 4—4 in Fig. 2; Fig. 5, a perspective in fragment showing my improved grain catcher, and Fig. 6 a similar view showing a modified form thereof.

In the form which I have preferred to illustrate my said invention in the drawings, the portion marked 10 indicates a threshing machine, which may be of any well known construction, provided with the usual straw rack or conveyer, as 11, and chaff riddle or winnower, as 12, which communicate with a material receiving chamber, such as a wind stacker hopper, 15, which latter communicates with a fan, 16, positioned in a fan-casing, 17, for discharging material through a chute, 18, as usual. The hopper 15 is preferably of a sloping character, as indicated most plainly in Figs. 3 and 4, and a portion of its lower end is cut away to receive a grain catcher the lower portion of which is positioned considerably below the walls, 20, 21, of the hopper. Said grain catcher comprises one or more (but preferably several) guides, 24, of any suitable form or construction, but which preferably are tapered in form, their lower sides inclining downwardly and their upper sides being approximately in line with a beaded or projecting grain deflector, 23, preferably associated with the fan-casing 17, the ends of said guides 24 being in close proximity to said grain deflector 23 and inclining away therefrom to their lower sides (see Fig. 4), the result being that a larger space constituting a grain outlet, 19, is provided between the lower sides of said guides 24 and said fan-casing 17 than between the upper sides of said guides and grain deflector 23. Said grain catcher may be formed of a single sheet of material suitably corrugated, as indicated in Fig. 5, to provide guides, as 24, but such guides may be made separately and affixed to a base plate, as 22, as shown in Fig. 6, or if desired the structure shown in Fig. 5 may be placed on said plate, in either of which cases substantially the same structure is secured and the same results attained and as will be readily understood also, where practicable, said hopper 15 may be so formed as to embody said grain catching device as an integral part thereof. As indicated by dotted and full lines in Fig. 2, I lead an auxiliary blast pipe, 30, from fan-casing 17 and at the end thereof provide a nozzle, 31, which is fitted into a spaced portion, at 32, Fig. 4, of the hopper 15 at a point where the blast therefrom will be directed and distributed across the guides 24 and into the fan opening, 33. As said fan-casing and auxiliary blast pipe are substantially the same in construction and arrangement as shown and described in United States Letters Patent No. 1,028,793, issued June 4, 1912, upon my application, the same will not be more specifically described herein. Beneath said grain catcher I place a conveyer of any appropriate construction and arrangement, which leads to the tailings auger, 35, of the threshing machine, or other desired part thereof, the conveyer shown for purposes of illustration being composed of a casing, 37, open at a portion of its upper side beneath the opening 19 between guides 24 and fan-casing 17 and having a hood, 38, covering said open portion. In said casing 37 I place a continuous conveyer composed of sprocket chains, 41, connected by cross members, 40, said chains being mounted on sprockets, 42, 43, shown in dotted lines in Fig. 1, at each end of the casing. Said conveyer may be driven in any suitable manner, a simple arrangement being that shown in Fig. 2, consisting of shaft, 45, mounted in suitable supports, upon one end of which shaft a sprocket, 46, is mounted which communicates with sprocket, 47, by means of chain, 48, said sprocket 47 being mounted on the shaft which supports sprocket 42. The outer end of shaft 45 is provided with a friction pulley, 49, which is held by a spring, 50, against driving belt, 51, running about pulley, 52, forming part of the threshing machine.

In operation, the straw traveling over the separating mechanisms, 11, and the chaff, etc., discharging from the winnowers, 12, over the tail-piece, 13, are deposited in hopper 15, which materials by gravity, the blast from nozzle 31, and suction from fan 16, are conveyed into said fan and discharged through chute 18 onto a stack or elsewhere. While the straw and chaff are thus being deposited in said hopper a considerable portion of unthreshed heads and loose grain (which has not been gathered in the threshing machine) is carried therewith into the hopper, and, being solid and heavy, the kernels and heads work through the other material, striking the hopper and traveling into the grain catcher between the guides 24 where such grain and heads are shielded from the straw and chaff riding on over the guides and into the fan. The grain is thus trapped in the grain catcher, and, by the blast from nozzle 31, is driven against the fan-casing 17 and under deflector 23 by which it is intercepted and precipitated through opening 19 into conveyer 37, and thereby conveyed to tailings auger 35 and by which and other devices present in a threshing machine it is returned to the machine and is caught and saved therein by the various mechanisms provided for catching grain separated by the cylinder and otherwise.

While I have shown and described an auxiliary blast pipe associated with the stacker fan for discharging a blast across said grain catcher, I do not desire to be understood as limiting myself to such arrangement, for, as is obvious, fans and blast conveying ducts may be operated from other parts of the machinery for such purpose, and also it will be understood that, under some conditions, such blast devices may be dispensed with, as, for instance, where the hoppers are provided with conveyers which may efficiently direct material to the guides and stacker fan, the latter withdrawing and discharging the straw while the loose grain will be saved in the manner hereinbefore stated. I desire it to be understood also that, while I have shown an endless conveyer for returning the saved grain to the threshing machine, I may accomplish the same result by blast mechanism or otherwise, or may omit a conveyer entirely and permit the material from the grain catcher to fall upon the ground or in sacks or other receptacles, if desired.

I claim as my invention:

1. A grain saving device for threshing machines, comprising a fan-casing, a fan therein, and a material receiving hopper communicating with said casing for conveying material thereinto and provided with an outlet at approximately its juncture with said casing through which grain separated from the material before it enters said fan casing may be discharged from said hopper independently of the other material.

2. A grain saving device for threshing machines, comprising a fan-casing, a fan therein, a material receiving hopper communicating with said casing for conveying material thereinto and provided with an outlet, and means in said hopper for separating grain from straw whereby straw may be directed into said fan and the grain directed through said outlet separately from the straw and saved therefrom.

3. A grain saving device for threshing machines, comprising a fan-casing, a fan therein, a material receiving and conveying hopper communicating with said casing and provided with an outlet, and a guide leading from said hopper to said casing over which straw passes into said casing and by which grain separated from said straw is shielded therefrom and discharges through the outlet of said hopper.

4. A device of the character described, comprising a material receiving and conveying receptacle having means therein through which grain separated from other material is precipitated, a fan communicating with one side of said receptacle for withdrawing material therefrom and discharging the same, and means associated with said receptacle for directing material toward said fan to cause a portion of the same to enter said fan and a portion thereof to pass through said receptacle.

5. A device of the character described, comprising a material-receiving and conveying receptacle having means therein through which grain separated from other material is precipitated, a fan at one side of said receptacle for withdrawing material therefrom and discharging the same, and blast producing means opposite said fan for discharging a blast through said receptacle to separate grain from other material.

6. A grain saving device for threshing machines, comprisng a fan-casing, a fan therein, a material receiving and conveying hopper communicating with said fan-casing, means associated therewith for separating grain from straw, means through which said separated grain is discharged from the hopper, and means for directing the straw into said fan.

7. A grain saving device for threshing machines, comprising a fan-casing, a fan therein, a material receiving and conveying hopper communicating with said fan-casing and having a grain discharging outlet, means associated therewith for separating grain from straw before the straw enters said fan casing, and means for returning such separated grain to the threshing machine.

8. A grain saving device for threshing machines, comprising a material receiving and conveying receptacle, a fan-casing communicating with said receptacle, a fan in said casing, means associated with said receptacle for guiding straw into said fan and separating grain therefrom before such straw enters said fan and means associated with said fan-casing for deflecting such separated grain through said receptacle.

9. In a grain saving device for threshing machines, the combination of a material receiving and conveying receptacle having a grain discharging outlet therein, a fan communicating with said receptacle, means associated with said receptacle for separating grain from other material before such material enters said fan, and means for intercepting and deflecting such separated grain through said outlet.

10. In a grain saving device for threshing machines, the combination of a material receiving and conveying receptacle having a grain discharging outlet therein, a fan communicating with said receptacle, means associated with said receptacle for separating grain from other material before such material enters said fan, means for intercepting and deflecting such separated grain through said outlet, and means for returning such separated grain to the threshing machine.

11. In a grain saving device for threshing machines, the combination of a material receiving and conveying receptacle having a grain discharging outlet therein, a fan communicating with said receptacle, means associated with said receptacle for separating grain from other material before such material enters said fan, means for intercepting and deflecting such separated grain through said outlet, and a conveyer for returning such separated grain to the threshing machine.

12. In a grain saving device for threshing machines, a material-receiving and conveying receptacle having a grain discharging outlet therein, means associated with said receptacle for separating grain from other material, a fan communicating with said receptacle, and means for directing material across and between said separating means in the direction of said fan.

13. In a grain saving device for threshing machines, the combination of a material receiving and conveying receptacle having a grain discharging outlet therein, a fan communicating with said receptacle, means associated with said receptacle for separating grain from other material before such material enters said fan, means for directing material across said separating means toward said fan, and means for deflecting separated grain through said outlet.

14. In a grain saving device for threshing machines, the combination of a material receiving and conveying receptacle having a grain discharging outlet therein, a fan communicating with said receptacle, means associated with said receptacle for separating grain from other material before such material enters said fan, means for directing material across said separating means toward said fan, means for deflecting separated grain through said outlet, and means for returning separated grain to the threshing machine.

15. In a device of the character described, a fan casing, a fan therein, a material receiving and conveying hopper communicating with said fan-casing and a portion of which is spaced therefrom, said hopper comprising corrugations between which grain is trapped from material which passes over said corrugations and discharged from said hopper separately from said other material.

16. A grain saving device for threshing machines, comprising a fan-casing, a fan therein, a material receiving and conveying hopper communicating with said fan-casing and a portion of which is spaced therefrom, and a grain deflector adjoining the inlet of said fan-casing whereby grain separated from other material in said hopper will be deflected through said spaced portion.

17. In a grain saving device for threshing machines, a fan-casing, a fan therein, a material receiving and conveying hopper communicating with said casing, and a deflector adjoining the inlet of said fan casing for preventing grain separated from other material from entering therein.

18. In a grain saving device for threshing machines, a fan-casing, a fan therein, and a material receiving and conveying hopper communicating with said fan-casing, a portion of which is spaced therefrom at its juncture with said casing to permit grain to be separated from straw and discharged through said space before the latter enters said fan-casing.

19. In a grain saving device for threshing machines, a fan, a material receiving and conveying receptacle communicating therewith, means associated with said receptacle and interposed between the straw delivering means of the thresher and said fan adjacent the inlet of the latter and in the path of travel of the material discharging from said delivering means, for separating and trapping grain mingled with such material before the latter enters said fan.

20. In a grain saving device for threshing machines, a fan, a material receiving and conveying receptacle communicating therewith, a grain trap associated with said receptacle and adjacent the inlet of said fan comprising means for capturing grain separated from other material before the latter enters said fan.

21. In a grain saver, the combination of a main separator adapted to deliver straw, chaff and unseparated grain to the rear thereof, a material receiving and conveying receptacle arranged transversely of said separator into which said materials are discharged, means for causing said materials to travel through said receptacle, means for conveying said materials away from said receptacle, and auxiliary separating means associated with said receptacle including an outlet between it and said conveyer through which grain is discharged.

22. In a grain saving device for threshing machines, the combination of a fan for discharging straw and chaff, a material-receiving and conveying receptacle communicating therewith, means adjacent said fan for separating grain from straw and chaff by gravity action, and means for directing an independent blast of air in line with the travel of the material into said fan whereby straw and chaff are blown into the fan and grain falls into said separating means.

In testimony whereof I affix my signature in presence of two witnesses.

JOSEPH K. SHARPE, Jr.

Witnesses:
C. E. SLOAN,
LEE R. GARBER.